(12) United States Patent
Warshaw et al.

(10) Patent No.: US 8,670,846 B2
(45) Date of Patent: Mar. 11, 2014

(54) SYSTEM AND METHOD FOR CONDUCTING A COMPETITION

(75) Inventors: Lisa Warshaw, Wynnewood, PA (US); Olaino Hardaway, Newtown, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 0 days.

(21) Appl. No.: 13/194,417

(22) Filed: Jul. 29, 2011

(65) Prior Publication Data

US 2012/0116549 A1    May 10, 2012

Related U.S. Application Data

(60) Provisional application No. 61/368,793, filed on Jul. 29, 2010.

(51) Int. Cl.
*A63F 13/00* (2006.01)

(52) U.S. Cl.
USPC .................. 700/91; 700/92; 705/51; 705/60; 705/64

(58) Field of Classification Search
USPC ............................ 700/91, 92; 705/51, 60, 64
See application file for complete search history.

(56) References Cited

U.S. PATENT DOCUMENTS

| | | | | |
|---|---|---|---|---|
| 7,711,584 B2 * | 5/2010 | Helitzer et al. | | 705/4 |
| 7,840,966 B2 * | 11/2010 | Dodge et al. | | 718/102 |
| 8,015,055 B2 * | 9/2011 | Makita et al. | | 705/7.38 |
| 2003/0167238 A1 * | 9/2003 | Zeif | | 705/400 |
| 2009/0104997 A1 * | 4/2009 | Ishida et al. | | 463/43 |
| 2009/0317066 A1 * | 12/2009 | Shibasaki | | 386/124 |
| 2012/0231866 A1 * | 9/2012 | Witty et al. | | 463/17 |

* cited by examiner

*Primary Examiner* — Arthur O. Hall
*Assistant Examiner* — Shahid Kamal
(74) *Attorney, Agent, or Firm* — Mark S. Cohen; Pearl Cohen Zedek Latzer Baratz LLP

(57) ABSTRACT

This invention relates to system and method for conducting a competition. Specifically, the invention relates to a computer-implemented peer-to-peer anonymous evaluation to determine a winner of a competition.

27 Claims, 10 Drawing Sheets

Report #3 of 8:

Lorem ipsum dolor sit amet, consectetur adipisicing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum.

Lorem ipsum dolor sit amet, consectetur adipisicing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum.

The message is clear: 5.8
Strong/logical support: 7.3
Persuasive: 6.7
Grammatically correct: 9.6
Written in an engaging style: 7.9

SUBMIT

FIGURE 7

Judges' Rankings:

1: Cohort B writer *(Winner!)*
2: Cohort D writer
3: Cohort G writer
4: Cohort F writer
5: Cohort L writer
6: Cohort K writer
7: Cohort E writer
8: Cohort A writer
9: Cohort I writer
10: Cohort C writer
11: Cohort H writer
12: Cohort J writer Reviewers' Rankings:

Cohort G reviewer: 4 matches *(Winner!)*
Cohort D reviewer : 3 matches
Cohort H reviewer : 3 matches
Cohort A reviewer : 2 matches
Cohort E reviewer : 2 matches
Cohort J reviewer : 2 matches
All others: 1 or no matches (In case of tie, the reviewers' scores from earlier rounds will be the tiebreaker.)

FIGURE 10

SYSTEM AND METHOD FOR CONDUCTING A COMPETITION

CROSS-REFERENCE TO RELATED APPLICATIONS

This application claims priority to U.S. Provisional Patent Application 61/368,793, filed Jul. 29, 2010, which is incorporated by reference herein in its entirety.

FIELD OF THE INVENTION

The invention relates to system and method for conducting a competition. Specifically, the invention relates to a computer-implemented peer-to-peer anonymous to evaluation to determine a winner of a competition.

BACKGROUND OF THE INVENTION

Writing is a key aspect of communicating in business and other professional environments. What has made teaching and practicing good writing intractable problems is lack of awareness. Most workplaces offer little or no opportunity for an employee to learn that he/she is a weak writer.

Teaching writing is therefore important for students in business and other professional programs, but there's been reluctance to emphasize writing in these programs. Faculty typically don't lower grades due to poor writing, so students have little or no incentive to improve as writers. Traditionally, students do not receive signals from employers that writing talent will influence hiring or promotion. Due to students' lack of incentives in both their academic and career goals, many students lack enthusiasm to improve writing skills. As a result, it is often frustrating for teachers to teach writing skills.

Accordingly, there exists a need for a computer based system to encourage student participation, and thereby improve a learning environment for writing skills.

SUMMARY OF THE INVENTION

In one embodiment, the invention relates to a system for conducting a competition, said system comprising: a dividing unit that divides users of said system into a plurality of groups; a challenge presentation unit that presents a challenge to one or more users of said plurality of groups; a response entry unit that enables at least one user to enter a response for said challenge; an assignment unit that assigns said response to one or more users for evaluating said response; an evaluation unit that enables said one or more assigned users to evaluate and rate said response based on a plurality of predetermined criteria; a collection unit that collects evaluation results from said one or more assigned users; and a selection unit that selects a winner based on collected evaluation results. In an exemplary embodiment, the evaluation unit enables one or more users to evaluate the quality or accuracy of evaluation and rating provided by said one or assigned users.

In another embodiment, the invention relates to a system for conducting a competition, said system comprising: a dividing means that divides users of said system into a plurality of groups; a challenge presentation means that presents a challenge to one or more users of said plurality of groups; a response entry means that enables at least one user to enter a response for said challenge; an assignment means that assigns said response to one or more users for evaluating said response; an evaluation means that enables said one or more assigned users to evaluate and rate said response based on a plurality of predetermined criteria; a collection means that collects evaluation results from said one or more assigned users; and a selection means that selects a winner based on collected evaluation results.

In another embodiment, the invention relates to a method for conducting a competition, said method comprising: dividing users of a system into a plurality of groups; displaying a challenge to one or more users of said plurality of groups; enabling at least one user to enter a response for said challenge; assigning said response to one or more users for evaluating said response; enabling said one or more assigned users to evaluate and rate said response based on a plurality of predetermined criteria; collecting evaluation results from said one or more assigned users; and selecting a winner based on collected evaluation results.

In another embodiment, the invention relates to a computer readable storage media comprising instructions to perform a method for conducting a competition, said method comprising: dividing users of a system into a plurality of groups; displaying a challenge to one or more users of said plurality of groups; enabling at least one user to enter a response for said challenge; assigning said response to one or more users for evaluating said response; enabling said one or more assigned users to evaluate and rate said response based on a plurality of predetermined criteria; collecting evaluation results from said one or more assigned users; and selecting a winner based on collected evaluation results.

Other features and advantages of the present invention will become apparent from the following detailed description examples and figures. It should be understood, however, that the detailed description and the specific examples while indicating preferred embodiments of the invention are given by way of illustration only, since various changes and modifications within the spirit and scope of the invention will become apparent to those skilled in the art from this detailed description.

BRIEF DESCRIPTION OF THE DRAWINGS

The invention will be better understood from a reading of the following detailed description taken in conjunction with the drawings in which like reference designators are used to designate like elements, and in which:

FIG. 7 illustrates an example of a rating system and criteria for rating, according to one embodiment of the invention.

FIG. 10 illustrates an example of rating of reviewers and judges, according to one embodiment of the invention.

DETAILED DESCRIPTION OF THE INVENTION

The invention provides system and method for conducting a competition. Specifically, the invention provides to a computer-implemented peer-to-peer evaluation to determine a winner of a competition.

Figure 1:
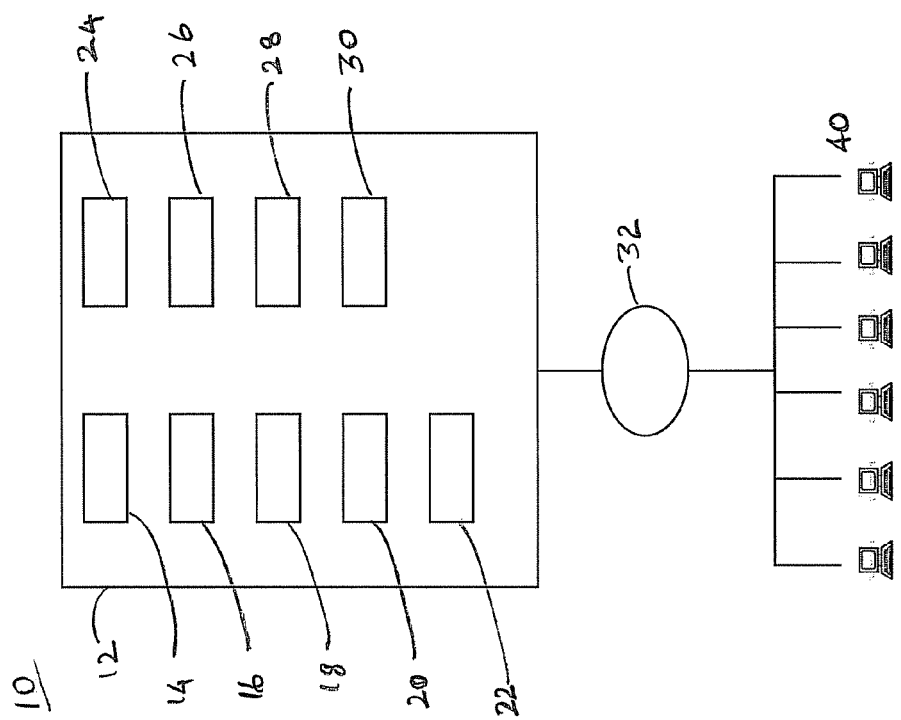
FIG. 1 illustrates a system for conducting a competition, according to one embodiment of the invention.

FIG. 1 schematically illustrates one arrangement of a system for conducting a competition. Although the FIG. 1 environment shows an exemplary conventional general-purpose digital environment, it will be understood that other computing environments may also be used. For example, one or more embodiments of the present invention may use an environment having fewer than or otherwise more than all of the various aspects shown in FIG. 1, and these aspects may appear in various combinations and sub-combinations that will be apparent to one of ordinary skill in the art.

As shown in FIG. 1, a user computer 40 can operate in a networked environment using logical connections to one or more remote computers, such as a remote server 12. The server 12 can be a web server, a router, a network PC, a peer device or other common network node, and typically includes many or all of the elements of a computer. It will be appreciated that the network connections shown in FIG. 1 are exemplary and other techniques for establishing a communications link between the computers can be used. The connection may include a local area network (LAN) and a wide area network (WAN). The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers as well as non-web interfaces can be used to display and manipulate data.

In one aspect, the competition may be conducted in an online environment. As illustrated in FIG. 1, a user (e.g., challenger) 42 has a user computer 40 with Internet access that is operatively coupled to server 12 via a network 32, which can be an internet or intranet. User computer 40 and server 12 implement various aspects of the invention that is apparent in the detailed description. For example, user computer 40 may be in the form of a personal computer, a tablet personal computer or a personal digital assistant (PDA). Tablet PCs interprets marks made using a stylus in order to manipulate data, enter text, and execute conventional computer application tasks such as spreadsheets, word processing programs, and the like. User computer 40 is configured with an application program that communicates with server 12. This application program can include a conventional browser or browser-like programs.

User computer 40 may be accessed by any user. In one embodiment, a user is a competitor who competes for a challenge. In another embodiment, a user is an individual who evaluates a response (e.g., answer) for a challenge. In another embodiment, a user is an individual who evaluates the quality or accuracy of an evaluation provided for a response (e.g., comments for an answer) for a challenge. In another embodiment, a user is a judge who does not participate in competition, but performs evaluations. In another embodiment, a user is administrator or anyone having access to system 10. In a particular embodiment, a user is a member of a group. The term "group," as used herein, may refer to any group such as, for example, but not limited to, a league, a club, a class, a section, and a division. In some embodiments, users are peers. In other embodiments, users are not peers.

The challenge of the invention may relate to any challenge, quiz, exam, or test that assesses skill or ability of a user. In a particular embodiment, the challenge is a writing skill assessment challenge that assesses a writing skill of a user. In another particular embodiment, the challenge is a quantitative skill assessment challenge that assesses a quantitative skill of a user. In another particular embodiment, the challenge is a analytical skill assessment challenge that assesses an analytical skill of a user. In some embodiments, the challenge may relate to evaluating science or engineering skills.

In one embodiment, server 12 may include a plurality of programmed units, for example, but are not limited to, a dividing unit 14, a challenge presentation unit 16, a response entry unit 18, an assignment unit 20, an evaluation unit 22, a collection unit 24, a selection unit 26, a judgment facilitating unit 28, and an identity protection unit 30. The term "unit," as used herein, may refer to a collection of programmed computer software codes for performing a task.

Based on user related information, dividing unit 14 may divide users of said system into a plurality of groups (e.g., leagues). User related information may refer to any information associated with a user, for example, user's specialization, background, and other data. The number of users within a group can be determined by any method that is apparent or known to one skilled in the art. In one embodiment, dividing unit 14 determines minimum number of users in each group using the following formula: $p=m/n$, wherein p is the minimum number of users in said group, m is the number of users competing for said challenge, and n is the number of groups for said challenge. In some embodiments, a process of grouping competitors may continue as long as necessary to lower the number of competitors down to a predetermined number to enter into a final competition.

Challenge presentation unit 16 may present a challenge to one or more users of the groups. In one embodiment, challenge presentation unit 16 may present a challenge to all users of all groups. In another embodiment, challenge presentation unit 16 may present a challenge to one or more pre-selected users of one or more pre-selected groups. Based on need or type of challenge, the selection of users may be apparent or known to one of skilled in the art.

In one arrangement, the challenge is presented and managed by challenge presentation unit 16 for presentation to user 42 on user computer 40. The challenge can be presented in alternative formats including (a) a text based format; (b) an audio format; (c) a video format; or (d) any combination thereof.

In one arrangement, challenge presentation unit 16 may include at least one or more programs that provide a text-based display that display a challenge. In another arrangement, challenge presentation unit 16 may include at least one or more program modules that provide a plurality of audio files embodying sound clips of the voice regarding a challenge. In an alternative arrangement, challenge presentation unit 16 may also include at least one or more program modules which provide a plurality of multimedia files regarding a challenge so that user 42 (e.g., challenger) can see and hear the challenge on user computer 40. The audio files and multimedia files are encoded in computer readable format on a computer usable storage medium, such as a floppy drive, optical disk, magnetic hardware drive, programmable memory, or any other device that stores digital data for processing. This facilitates the data to be transmitted via network streaming or other network protocol to the user computer 40. The audio files and multimedia files can be embodied in any appropriate digital encoded format for using in computing environments.

Response entry unit 18 may enable at least one user to enter a response for the challenge. Response also may be entered with one or more formats, discussed above, for example, text, audio, or video formats. In some embodiments, response entry unit 18 may enable a user to enter a response in a real time. In other embodiments, response entry unit 18 may enable a user to enter a response within a specified period of time. The term "response," as used herein, may refer to any type of response, for example, an answer for a challenge; an evaluation (e.g., comment, critique, or input) for an answer; or an evaluation for an evaluation provided for an answer.

Figure 4:
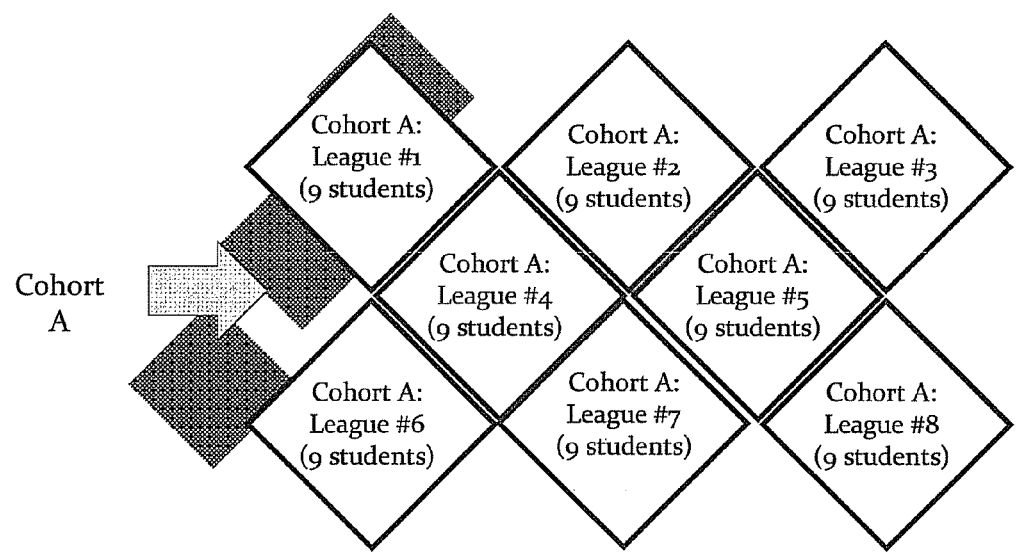
FIG. 4 illustrates groups of competitors (i.e., leagues within a cohort), according to one embodiment of the invention.

Assignment unit 20 may assign a response entry (e.g., answer for a challenge) to one or more users for evaluating the response. In one embodiment, assignment unit 20 randomly assigns a response to one or more users. In another embodiment, assignment unit 20 assigns a response based on a plurality of predetermined criteria. In yet another embodiment, assignment unit 20 assigns a response from a user in one group to another user in the same group or another user in another group. In some embodiments, assignment unit 20 assigns a response to a peer user. In other embodiments, assignment unit 20 assigns a response to a non-peer user. FIG. 4 is an illustration of a eight (8) groups (e.g., leagues) of competitors, according to one embodiment of the invention. The arrows indicate which group each other group will evaluate for purposes of both evaluative, scoring portions of the competition. The arrangement illustrated in FIG. 4 is sequential but the arrangement may also be random.

Evaluation unit 22 may enable one or more assigned users to evaluate and rate a response based on a plurality of predetermined criteria. For example, for a writing skill assessment challenge, the plurality of predetermined criteria to evaluate an answer may include, but are not limited to, clarity of response; strong and logical support; persuasiveness; grammatical correctness; and written in an engaging style. In some embodiments, system 10 may have tools or mechanisms to automatically point out or highlight errors in a response that can be detected mechanically by system 10. The one or more assigned users may rate the response based on any rating system, known to skilled in the art. For example, the one or more assigned users may rate the response on a 1-10 scale. Other examples include, but are not limited to, letter grade ratings, star ratings, sliding-scale ratings, and rankings.

In one embodiment, evaluation unit 22 enables one or more users to evaluate an answer submitted for a challenge. In another embodiment, evaluation unit 22 enables one or more users to evaluate the quality or accuracy of an evaluation provided for an answer. In another embodiment. evaluation unit 22 enables one or more users to edit, critique, or provide comments for any entry provided for a challenge. In one embodiment, a user may rate an answer for a challenge. In another embodiment, a user may rate an evaluation provided for an answer.

Collection unit 24 may collect evaluation results from the one or more assigned users. In some embodiments, one or more users who entered the response may receive quantitative feedback including, for example, score for each challenge, average scores for a set of challenges, total scores, rank, mean scores, median scores, and a range of scores. In a particular embodiment, the scoring of ratings for a user may be performed based on peer ratings. In one example, a rating that significantly correlates with the ratings of his or her peers may receive a better score. In one embodiment, a user's score may reflect ratings received for his or her answers to a challenge as well as ratings received for his or her evaluations submitted for other users' answers for a challenge.

In other embodiments, one or more users who entered the response may receive qualitative feedback including, for example, helpful suggestions or tips for improving skills. In one embodiment, based on scores for a response, system 10 may automatically provide a predetermined note to users who entered the response. The predetermined note may include, for example, helpful suggestions or tips for improving skills, invitation for a face-to-face meeting, and others.

In some embodiments, once the one or more assigned users has assessed or evaluated for each entry in a group in which he or she is a member, the user may then assess the quality of each critique or edit in the same group, based upon a predetermined criteria. Each assigned user may evaluate and score each entry and each edit or critique of each entry by providing a numerical score based on given criteria. In some embodiments, the assigned user may evaluate and score no less than and no more than a pre-determined number of entries. Based on the need or nature of a challenge, one of skilled in the art may determine number of entries. In one example, a user may evaluate and rate entries provided by half the number of users within a group (e.g., league).

In some embodiments, one or more third party users who do not participate in challenge may determine the helpfulness of qualitative evaluations, critiques, and other inputs provided by the assigned users. In other embodiments, one or more users who participate in challenge may determine the helpfulness of qualitative evaluations, critiques, and other inputs provided by the assigned users. In some embodiments, prior to receiving a quantitative evaluations or scores, a user may see qualitative evaluations first and then rate the assigned users in terms of their helpfulness.

In one embodiment, selection unit 26 may automatically select a winner based on collected results. In another embodiment, judgment facilitating unit 28 may enable one or more pre-selected users to be judges and enables said judges to determine a winner based on collected results.

In some embodiments, a challenge may include multiple levels of competitions, for example, one or more rounds of preliminary competition and a final competition. The final competition may be assessed by non-competitor users where the non-competitors may be professionals, knowledgeable or experienced, in the subject of the competition. The final competition may also be assessed by non-competitor users where the non-competitors may be non-professional judges who do not have knowledge or experience in the subject of the competition. The final competition may determine a winner of the competition. The winner of the competition may have the highest average score based upon the assessments of the non-competitors. In the final competition, each competitor user may continue to submit the entry they submitted for the initial competition. Each competitor user may critique or edit, in writing, each entry submitted for the final competition. If x represents the number of edits a competitor completes and m represents the number of competitors in the final competition, the maximum number of edits or critiques each entrant must complete would be m−1=x.

Figure 2:
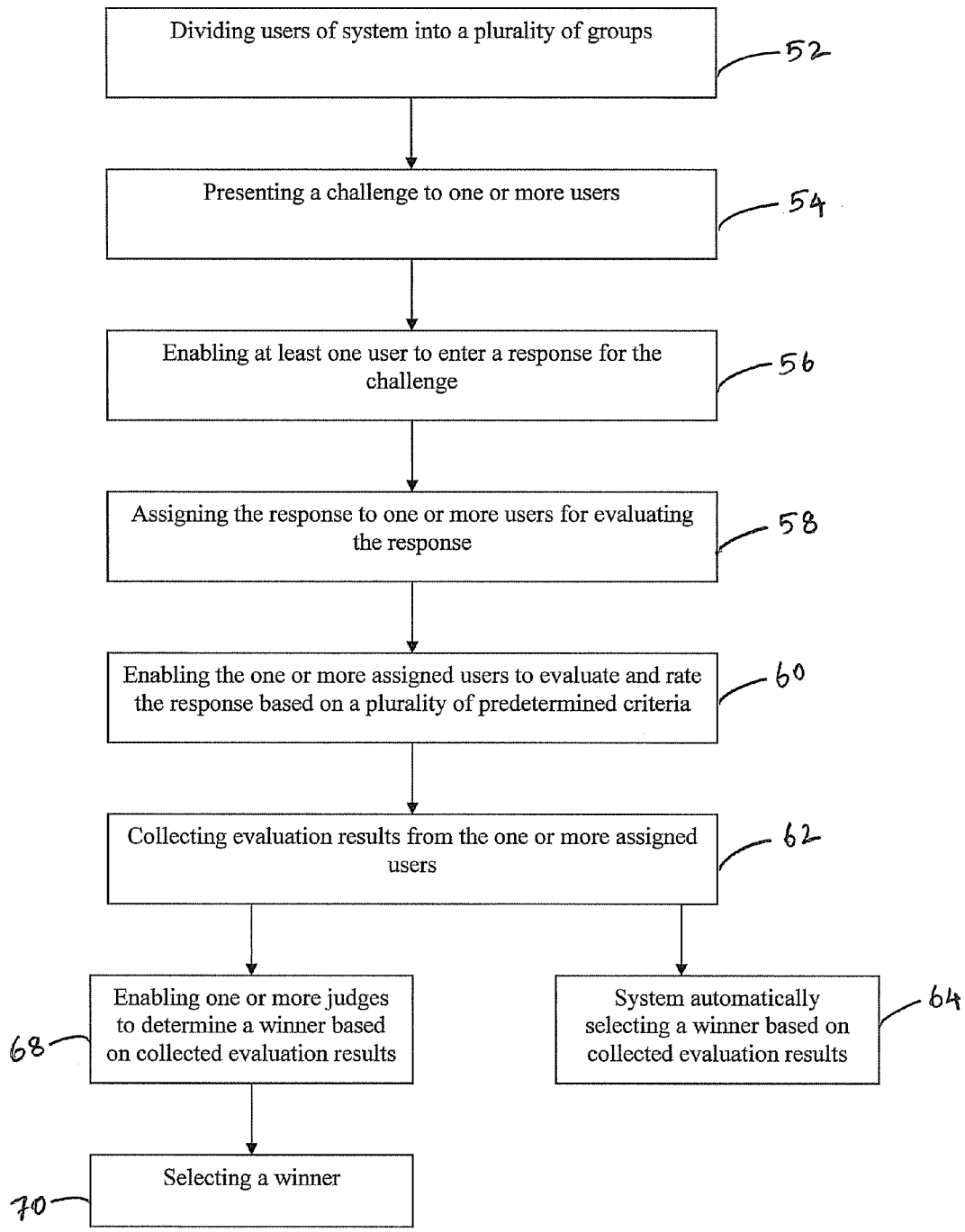
FIG. 2 illustrates a flow chart of a method for conducting a competition, according to one embodiment of the invention.

Identity protection unit 30 may enable a user to be an anonymous user. In some embodiments, identity protection unit 30 may enable only some users to anonymous user and others to be non-anonymous user FIG. 2 illustrates a process for conducting a competition, according to one embodiment of the invention. As shown in item 52, dividing unit 14 may divide users of the system 10 into a plurality of groups. As shown in item 54, challenge presentation unit 16 may present a challenge to one or more users of the groups. As shown in item 56, response entry unit 18 may enable at least one user to enter a response for the challenge. As shown in item 56, assignment unit 20 may assign a response entry to one or more users for evaluating the response. As shown in item 60, evaluation unit 22 may enable one or more assigned users to evaluate and rate the response based on a plurality of predetermined criteria. As shown in item 62, collection unit 24 may collect evaluation results from the one or more assigned users. In one embodiment, as shown in item 64, selection unit 26 may automatically select a winner based on collected evaluation results. In another embodiment, as shown in item 68, judgment facilitating unit 28 may enable one or more pre-selected users to be judges and enables said judges to determine a winner based on collected evaluation results, as shown in item 70.

Figure 3:
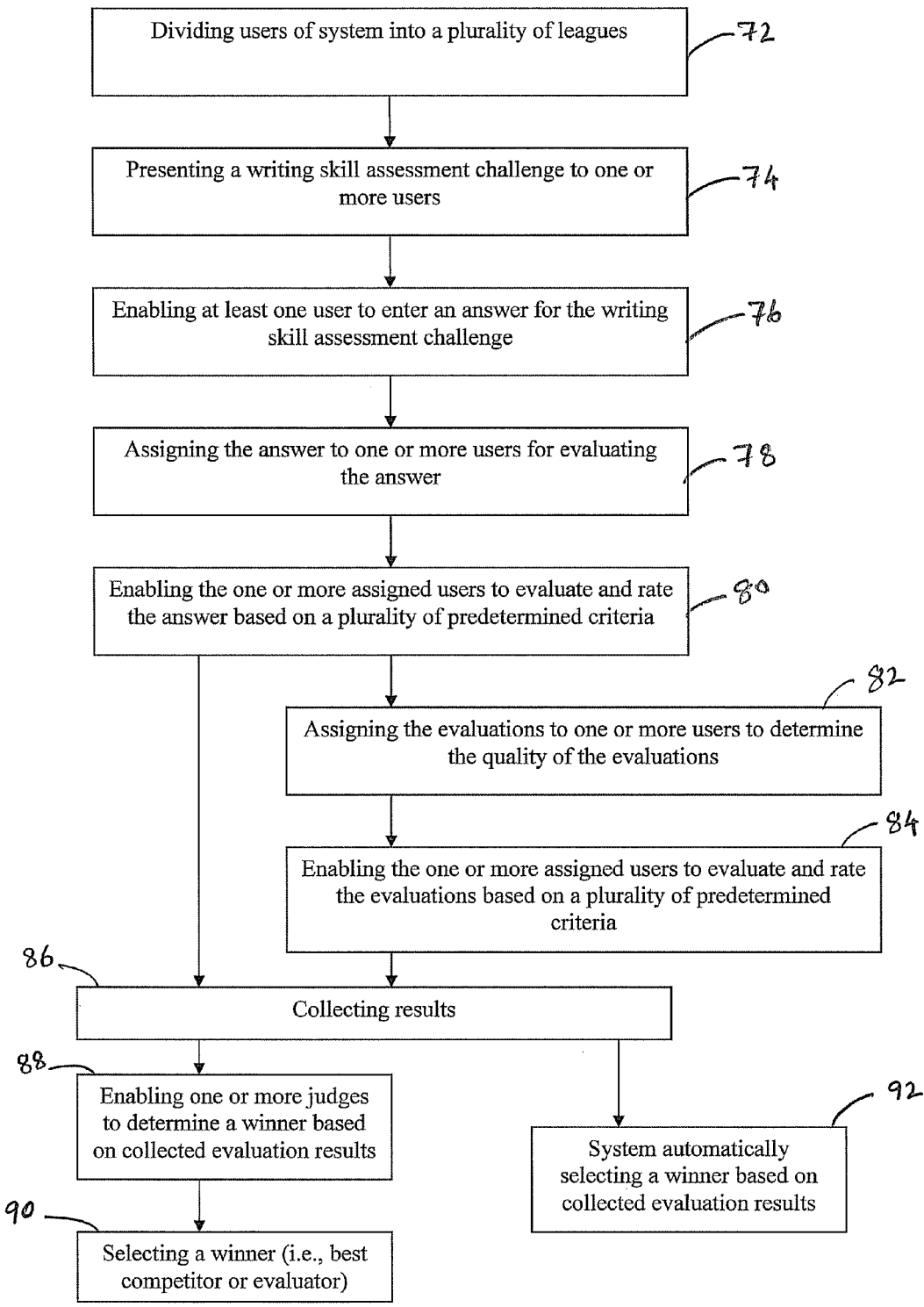
FIG. 3 illustrates a flow chart of a method for conducting a writing skill competition, according to one embodiment of the invention.

FIG. 3 illustrates a process for conducting a writing skill assessment competition, according to one embodiment of the invention. As shown in item 72, dividing unit 14 may divide users (e.g., student users) of the system 10 into a plurality of leagues. FIG. 4 illustrates groups of competitors (i.e., leagues within a cohort).

Figure 5:
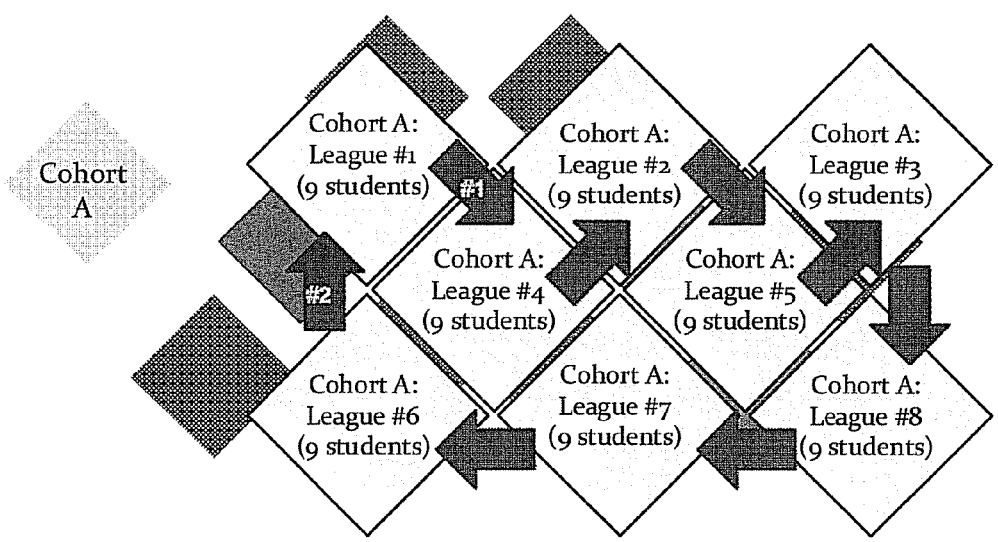
FIG. 5 illustrates an example of the responsibilities of a competitor user among groups, according to one embodiment of the invention. For example, users may review 9 responses written by peers (i.e., students at same level) within a different league of their cohort.
Figure 6:
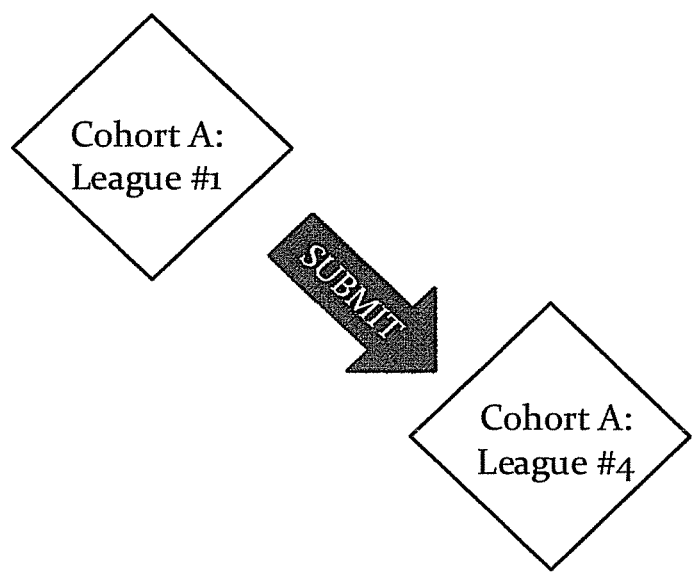
FIG. 6 illustrates an example of the responsibilities of a competitor user among groups, according to one embodiment of the invention. For example, users in league 1 may review and submit responses to league 4 of their cohort.
Figure 8:
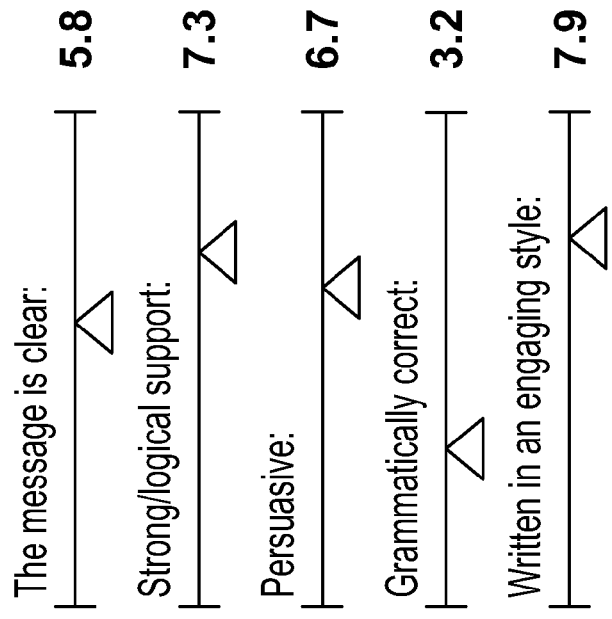
FIG. 8 illustrates an example of a rating system, criteria for rating, calculated scores, according to one embodiment of the invention.

As shown in FIG. 3, item 74, challenge presentation unit 16 may present a writing skill assessment challenge to one or more users of the leagues. As shown in item 76, response entry unit 18 may enable at least one user to enter an answer for the challenge. As shown in item 78, assignment unit 20 may assign an answer entry to one or more users for evaluating the answer. As shown in item 80, evaluation unit 22 may enable one or more assigned users to evaluate and rate the answer based on a plurality of predetermined criteria. FIG. 5 illustrates an example of the responsibilities of a competitor user among leagues, according to one embodiment of the invention. For example, users may review 9 responses written by peers (i.e., students at same level) within a different league of their cohort. FIG. 6 illustrates an example of the responsibilities of a competitor user among groups, according to one embodiment of the invention. For example, users in league 1 may review and submit responses to league 4 of their cohort. FIGS. 7 and 8 illustrate examples of a rating system, criteria for rating, calculated scores, according to one embodiment of the invention.

In some embodiments, as shown in FIG. 3, item 82, evaluation unit 22 may assign one or more users to determine the quality of evaluations provided for an answer. As shown in item 84, evaluation unit 22 may enable one or more assigned users to evaluate and rate the evaluations provided for an answer, based on a plurality of predetermined criteria.

As shown in FIG. 3, item 86, collection unit 24 may collect evaluation results from the one or more assigned users. In one embodiment, as shown in item 92, selection unit 26 may automatically select a winner based on collected evaluation results. In one embodiment, the winner is determined based on an answer provided for a challenge. In another embodiment, the winner is determined based on an evaluation, comment, edit, or critique provided for an answer. In yet another embodiment, the winner is determined based on an answer provided for a challenge as well as an evaluation, comment, edit, or critique provided for an answer.

Figure 9:
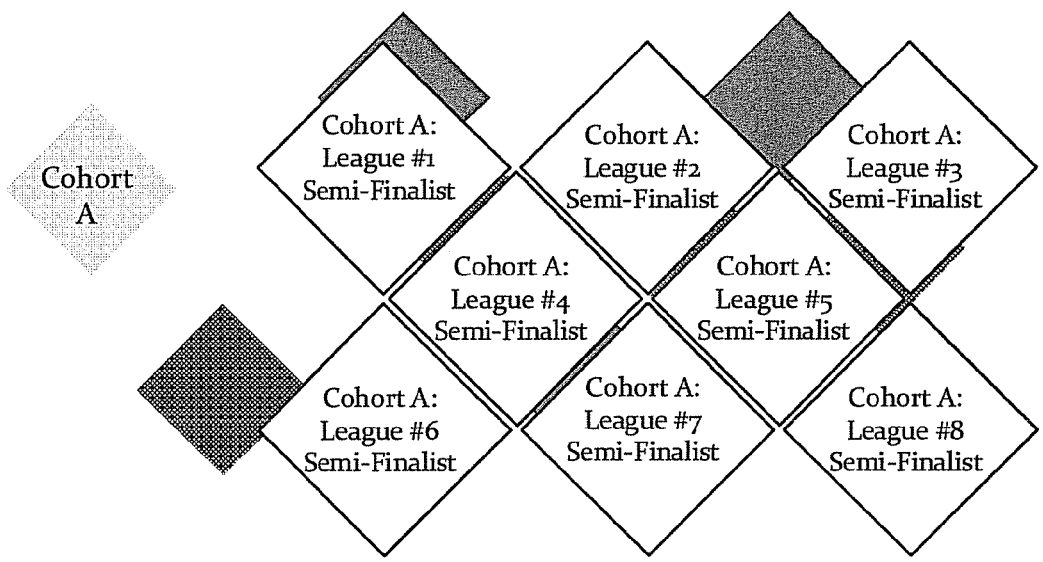
FIG. 9 illustrates an example of selecting a winner within a league in a multi-level competition, according to one embodiment of the invention.

In another embodiment, as shown FIG. 3, in item 88, judgment facilitating unit 28 may enable one or more pre-selected users to be judges and enables said judges to determine a winner based on collected evaluation results, as shown in item 90. FIG. 9 illustrates an example of selecting a winner within a league in a multi-level competition, according to one embodiment of the invention. FIG. 10 illustrates an example of rating of reviewers and judges, according to one embodiment of the invention.

Having described preferred embodiments of the invention with reference to the accompanying drawings, it is to be understood that the invention is not limited to the precise embodiments, and that various changes and modifications may be effected therein by those skilled in the art without departing from the scope or spirit of the invention as defined in the appended claims.

What is claimed is:

1. A system for conducting a competition, said system comprising:

a dividing unit that divides users of said system into a plurality of groups, wherein said dividing unit determines minimum number of users in each group using the following formula:

$$p=m/n$$

wherein p is the minimum number of users in said group, m is the number of users competing for a challenge, and n is the number of groups for said challenge;

a challenge display unit that displays a challenge to one or more users of said plurality of groups;

a response entry unit that enables at least one user to enter a response for said challenge;

an assignment unit that assigns said response to one or more users for evaluating said response;

an evaluation unit that enables said one or more assigned users to evaluate and rate said response based on a plurality of predetermined criteria;

a collection unit that collects evaluation results from said one or more assigned users; and a selection unit that selects a winner based on collected evaluation results.

2. The system of claim 1, wherein said system further comprising an identity protection unit that enables a user to be an anonymous user.

3. The system of claim 1, wherein said one or more assigned users are competitors who compete for said challenge.

4. The system of claim 1, wherein said system further comprising a judgment facilitating unit that enables one or more pre-selected users to be judges and enables said judges to determine a winner based on collected evaluation results.

5. The system of claim 1, wherein said challenge is a writing skill assessment challenge and said challenge display unit displays said writing skill assessment challenge.

6. The system of claim 1, wherein said assignment unit that assigns said response randomly to one or more users.

7. The system of claim 1, wherein said assignment unit that assigns said response based on a plurality of predetermined criteria.

8. The system of claim 1, wherein said assignment unit that assigns a response from a user in one group to another user in the same group or another user in another group.

9. A method for conducting a competition by a computing system, said method comprising:

dividing users of the system into a plurality of groups, wherein said dividing is performed by determining minimum number of users in each group using the following formula:

$$p=m/n$$

wherein p is the minimum number of users in said group, m is the number of users competing for a challenge, and n is the number of groups for said challenge;

displaying said challenge to one or more users of said plurality of groups;

enabling at least one user to enter a response for said challenge;

assigning said response to one or more users for evaluating said response;

enabling said one or more assigned users to evaluate and rate said response based on a plurality of predetermined criteria;

collecting evaluation results from said one or more assigned users; and selecting by a computing device, a winner based on collected evaluation results.

10. The method of claim 9, wherein said method further comprising enabling a user of said system to be an anonymous user.

11. The method of claim 9, wherein said one or more assigned users are competitors who compete for said challenge.

12. The method of claim 9, wherein said method further comprising enabling one or more pre-selected users to be judges and enabling said judges to determine a winner based on collected evaluation results.

13. The method of claim 8, wherein said challenge is a writing skill assessment challenge.

14. The method of claim 9, wherein said response is assigned randomly to one or more users.

15. The method of claim 9, wherein said response is assigned based on a plurality of predetermined criteria.

16. The method of claim 9, wherein a response from a user in one group is assigned to another user in the same group or another user in another group.

17. A non-transitory computer readable storage media comprising instructions to perform a method for conducting a competition, said method comprising:

dividing users of a system into a plurality of groups, wherein said dividing is performed by determining minimum number of users in each group using the following formula:

$$p = m/n$$

wherein p is the minimum number of users in said group, m is the number of users competing for said challenge, and n is the number of groups for said challenge;

displaying said challenge to one or more users of said plurality of groups;

enabling at least one user to enter a response for said challenge;

assigning said response to one or more users for evaluating said response;

enabling said one or more assigned users to evaluate and rate said response based on a plurality of predetermined criteria;

collecting evaluation results from said one or more assigned users; and selecting a winner based on collected evaluation results.

18. The media of claim 17, wherein said method further comprising enabling a user of said system to be an anonymous user.

19. The media of claim 17, wherein said one or more assigned users are competitors who compete for said challenge.

20. The media of claim 17, wherein said method further comprising enabling one or more pre-selected users to be judges and enabling said judges to determine a winner based on collected evaluation results.

21. The media of claim 17, wherein said challenge is a writing skill assessment challenge.

22. The media of claim 17, wherein said response is assigned randomly to one or more users.

23. The media of claim 17, wherein said response is assigned based on a plurality of predetermined criteria.

24. The media of claim 17, wherein a response from a user in one group is assigned to another user in the same group or another user in another group.

25. The system of claim 1, further comprising an evaluation unit that enables one or more users to evaluate the quality or accuracy of evaluation and rating provided by said one or more assigned users.

26. The system of claim 1, further comprising a scoring unit that provides score to a user's response based on its correlation with peer's response.

27. The system of claim 1, wherein the selection unit selects a winner based on a score or rating received for an answer to a challenge as well as a score or rating received for an evaluation to an answer.

* * * * *